March 31, 1942.  E. G. KESLING  2,277,913
GEAR SHIFTING MECHANISM
Filed March 14, 1938  4 Sheets-Sheet 1
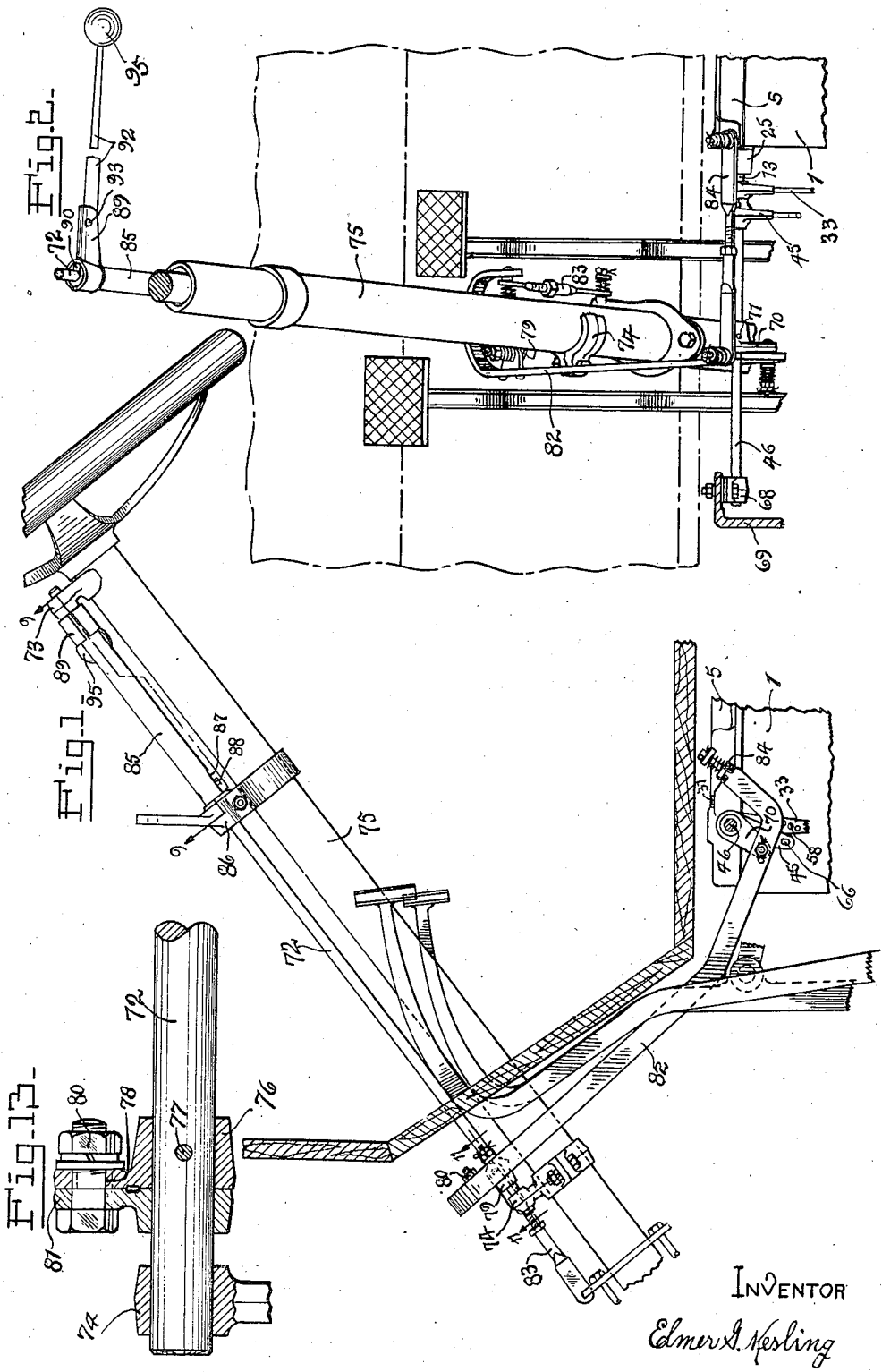
INVENTOR
Elmer G. Kesling

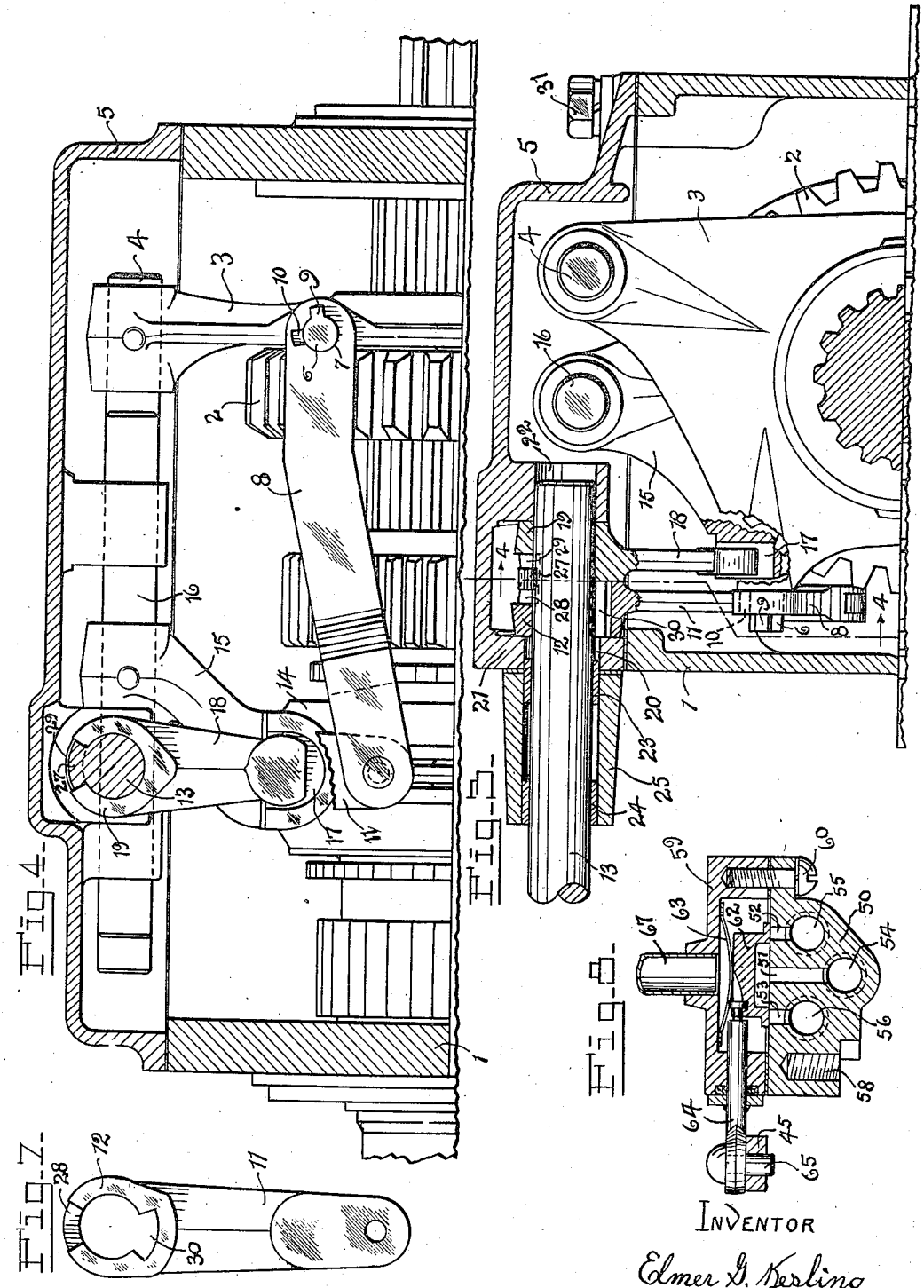

March 31, 1942. E. G. KESLING 2,277,913
GEAR SHIFTING MECHANISM
Filed March 14, 1938 4 Sheets-Sheet 3
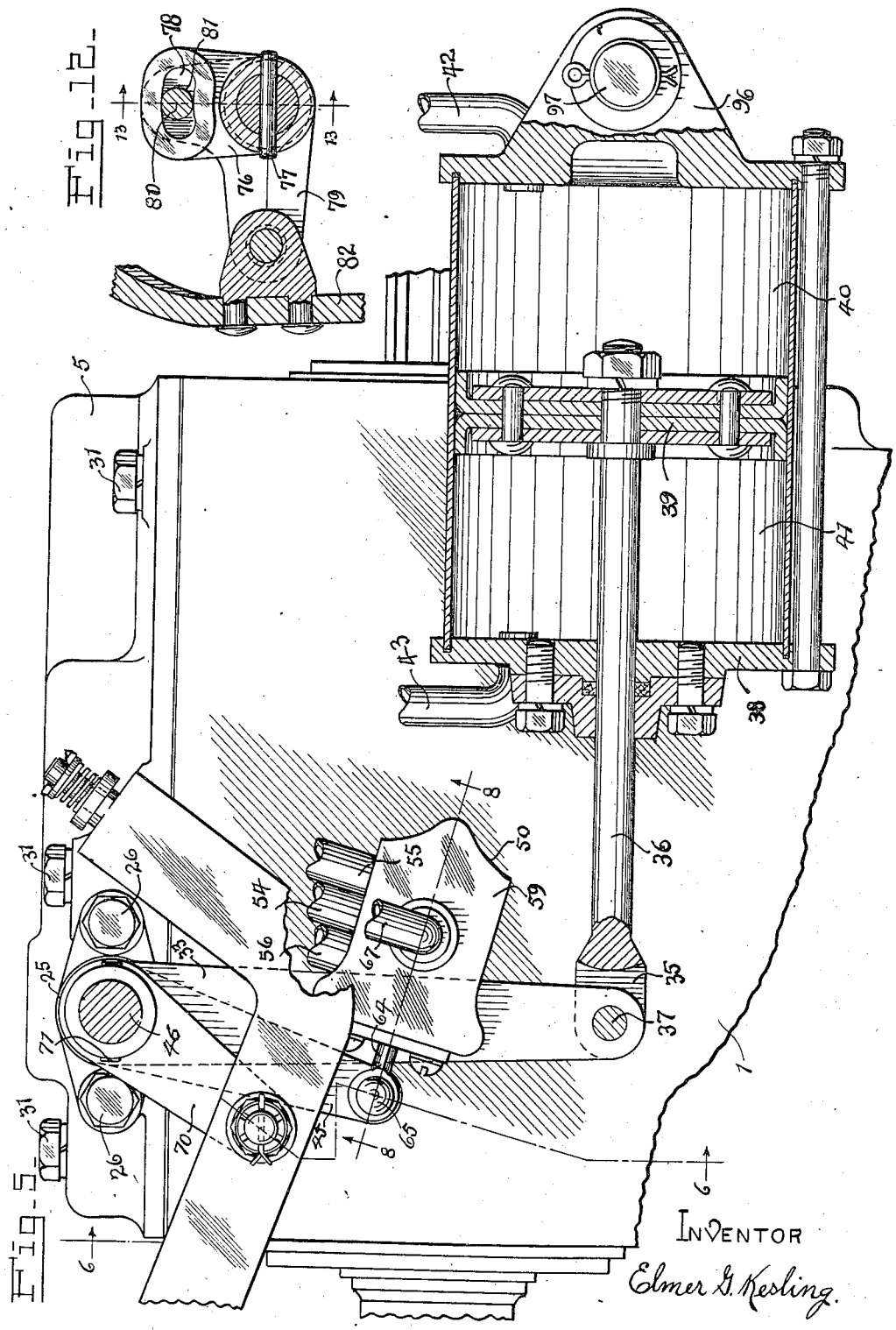
INVENTOR
Elmer G. Kesling.

March 31, 1942.  E. G. KESLING  2,277,913
GEAR SHIFTING MECHANISM
Filed March 14, 1938   4 Sheets-Sheet 4
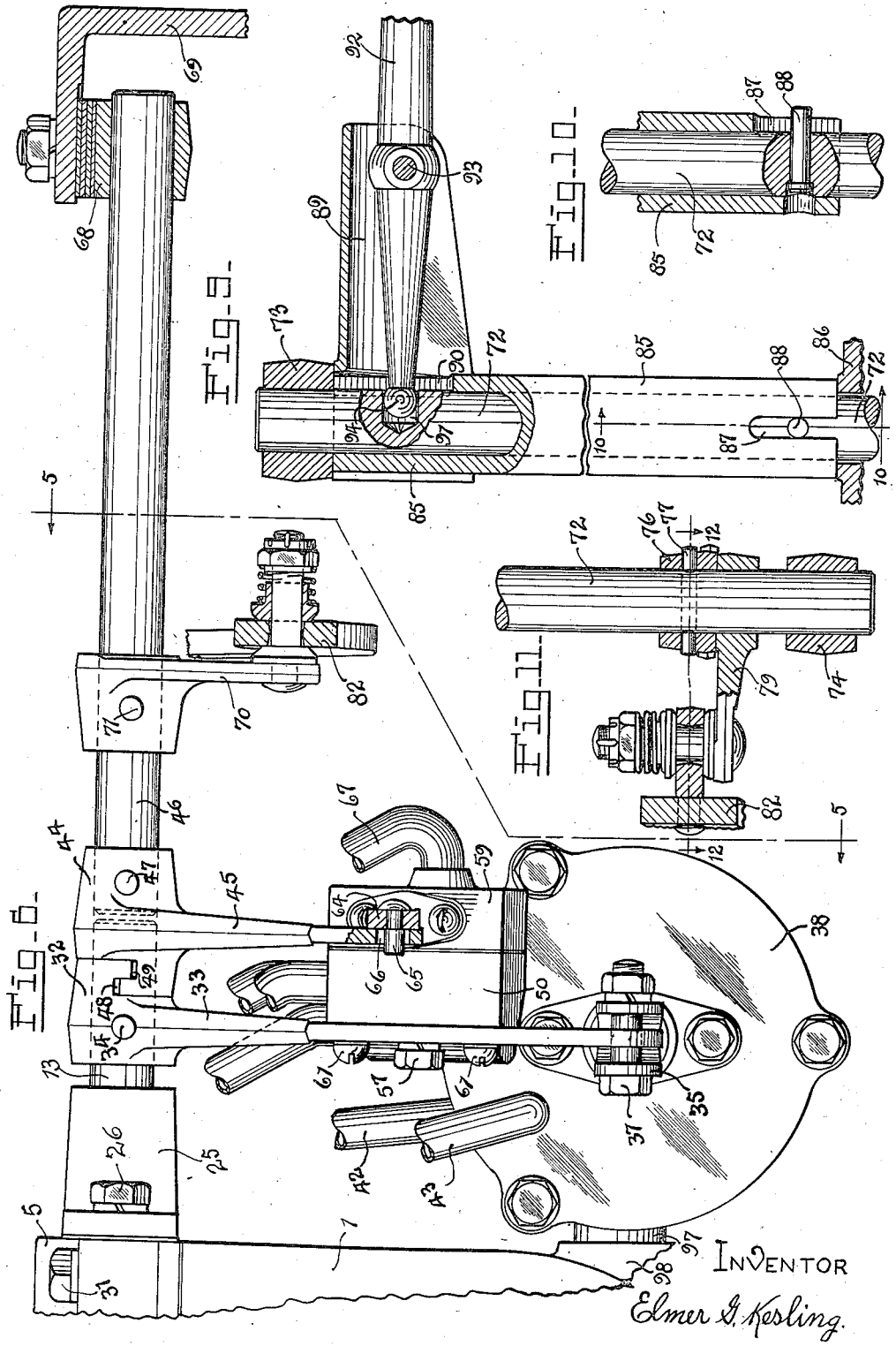
INVENTOR
Elmer G. Kesling.

Patented Mar. 31, 1942

2,277,913

UNITED STATES PATENT OFFICE 2,277,913

GEARSHIFTING MECHANISM

Elmer G. Kesling, Bloomfield, Mo.

Application March 14, 1938, Serial No. 195,865

10 Claims. (Cl. 74—473)

This invention relates to speed changing mechanism for use in automobiles and other vehicles, and especially to the type comprising an operating shaft and an actuating spindle both mounted for longitudinal and turning movements, having a manually operated lever for operating said shaft and shifter elements selectively shiftable by said actuating spindle; and more especially to the type wherein said longitudinal movements are selective movements and said turning movements are speed changing movements.

The invention relates more particularly to the construction and arrangement of the means operatively connecting said lever to said shaft, and the construction and assemblage of said shifter element parts, and includes a power device for assisting the manual means in effecting the shifting movements.

The required rockable and longitudinally movable shaft and spindle are used in a number of my inventions; and they are operatively connected in different ways in the different inventions.

In this invention I have elected to show the improvement in combination with the construction shown in my Patent No. 1,877,886, granted September 20, 1932, in which a link and lever element is used to operatively connect the shaft and spindle.

Objects of the invention are to provide mechanism that may be used interchangeably with the old conventional floor lever shift on the same transmission case, to provide mechanism having a manually operated remote control in conjunction with which a power assisting means for effecting the shifting movements may or may not be used as desired; to provide mechanism easy of operation and having the operating means conveniently placed in reach of the operator; to provide mechanism easily installed in the automobile and requiring a minimum of change of the other parts of the car; to provide mechanism for attaching the manual operating lever to the operating shaft that is simple of construction and easy to assemble; to provide means whereby the selective shifting arms may be easily assembled in the case cover.

Other objects will be apparent from the following description, reference being made to the accompanying drawings, in which—

Fig. 1 is a side elevation of the parts of the speed control mechanism of an automobile having my invention combined therewith; but showing the lever connections only of the power assisting means.

Fig. 2 is a rear elevation.

Fig. 3 is a vertical transverse view through the transmission case and cover with parts in section showing my invention combined therewith.

Fig. 4 is a cross sectional view on the line 4—4 of Fig. 3.

Fig. 5 is a view substantially on the line 5—5 of Fig. 6 but with part of the power means partly in section.

Fig. 6 is a view substantially on the line 6—6 of Fig. 5.

Fig. 7 is a side elevation of the low and reverse shifting arm as viewed toward the left in Fig. 3.

Fig. 8 is a cross sectional view on the line 8—8 of Fig. 5.

Fig. 9 is a sectional view approximately on the line 9—9 of Fig. 1.

Fig. 10 is a vertical sectional view on the line 10—10 of Fig. 9.

Fig. 11 is a vertical sectional view on the line 11—11 of Fig. 1.

Fig. 12 is a cross sectional view on the line 12—12 of Fig. 11.

Fig. 13 is a vertical sectional view on the line 13—13 of Fig. 12.

The case 1 encloses the customary transmission gearing. The present invention is not concerned with the construction of the gearing that is within the case 1, except that it is to be understood that they are of the shifter element type for effecting the different speed relations.

In the showing of the drawings the low and reverse speed relations are effected through the sliding gear 2 which is moved by the low and reverse yoke 3 supported by the customary shift rail 4 mounted for longitudinal movements in a case cover 5.

A bearing pin 6 is formed on one side of the yoke 3 for pivotal attachment in a hole 7 in one end of a link 8. A lug 9 is formed on one side of the outer end of the pin 6.

A notch 10 is formed in the link 8 at one side of the hole 7. The lug 9 and the notch 10 are so placed that the lug 9 will pass through the notch 10 when the link 8 is turned in an abnormal relation with respect to the yoke 3, and the lug 9 will prevent the link 8 from coming off of the pin 6 when placed thereon and then turned to the normal relation with respect to the yoke 3. The other end of the link 8 is pivotally attached to the lower end of crank arm 11. The other end of the arm 11 has a hub 12 formed thereon which is loosely mounted on a rockable and longitudinally movable spindle 13.

In the showing of the drawings the second and high speed relations are effected through the synchronizer 14 which is moved by the second and high yoke 15 supported by the customary shift rail 16 mounted for longitudinal movements in the case cover 5. A notch 17 formed on one side of the yoke 15 is directly engaged by the lower end of a crank arm 18. The other end of the arm 18 has a hub 19 formed thereon which is loosely mounted on the spindle 13.

The spindle 13 extends through a hole 20 in a side 21 of the cover 5 and is supported in a bearing 22 depending from the upper wall of the cover 5 and in bushings 23 and 24 in a projection 25 secured to the cover 5 by bolts 26. The inner end of the bushing 23 extends beyond the projection 25 and fits into the hole 20 for alignment purposes.

The hubs 12 and 19 are mounted on the spindle 13 between the wall 21 and the bearing 22 and are held from longitudinal movement with said spindle 13 by said wall 21 and bearing 22.

A lug 27 is formed on the spindle 13, and by longitudinal movements of the spindle 13 may be brought into engagement with either of the notches 28 or 29 formed in the adjacent faces of the respective hubs. Thus it will be seen that longitudinal movements of the spindle 13 will selectively engage the hub 12 or 19, and rotative movements of the spindle 13 will swing the respective arm 11 or 18, as the case may be.

The depth of the notches 28 and 29 and the thickness of the lug 27 controls the extent of the longitudinal movements of the spindle 13, and these depths and this thickness are in such proportion that when the lug 27 is entirely in one of the notches 28 or 29 it will be entirely out of the other notch 28 or 29, as the case may be.

The lug 27 may be made integral with the spindle 13 or secured thereto in any manner.

The hole 20 is large enough to permit the passage therethrough of the spindle 13 and the lug 27 when the lug 27 is made integral with or secured to said spindle 13.

A notch 30 is formed through the hub 12, and the notch 30 is of such size to allow the passage of the lug 27 through the hub 12.

In assembling the arms it will then be seen that if the arm 11 is turned backward and the arm 18 turned forward in the cover 5 until the notches 20 and 30 are in alignment, the spindle 13 and lug 27 may be passed through the hole 20 and the hub 12 and into the hub 19 and bearing 22 until the lug 27 is in the notch 29; whereupon the arms 11 and 18 may both be turned downwardly to normal position and the assemblage is completed by putting the projection 25 in place over the outer end of the spindle 13 and placing the bolts 26, positioning the yokes 3 and 15, inserting the rails 4 and 16 and securing the respective yokes thereto.

The case cover 5 is secured to the case by bolts 31 which may be inserted in the same holes in the case as the bolts for securing the case cover containing the customary floor lever shift.

The spindle 13 projects beyond the outer end of the projection 25 and has the hub 32 of a crank arm 33 secured thereto by a pin 34. The free end of the arm 33 is pivotally connected to the forked end 35 of a piston rod 36 by a bolt 37. The space between the sides of the forked end 35 is sufficient to allow the lever 33 to slide along the bolt 37 as said lever is moved with the longitudinal movements of the spindle 13.

The piston rod 36 extends into a cylinder 38 and is connected to a piston 39 which divides the cylinder 38 into two compartments 40 and 41 which have tubes 42 and 43 respectively communicating therewith.

The spindle 13 projects beyond the end of the hub 32 and into a hub 44 of an arm 45. The hub 44 is secured to the abutting end of a second spindle 46 by a pin 47.

Interlocking notches 48 and 49 are cut in the adjacent ends of the respective hubs 32 and 44. The notches 48 and 49 are of such depth to allow a certain amount of free relative swinging movements of the arms 33 and 45, and to hold said hubs in end-to-end relation.

A device 50 having port holes 51, 52 and 53 formed therein with tubes 54, 55 and 56 respectively communicating therewith is secured to the arm 33 by a bolt 57 in a hole 58.

A cover 59 is secured to the device 50 by screws 60 and 61. The cover 59 houses a slide valve 62 which is resiliently held in place by a spring 63, and which is pivotally connected to one end of a rod 64 which extends through a wall of the cover 59 and has a pin 65 secured in the end thereof. The pin 65 extends in a slot 66 in the free end of the arm 45. It is clearly seen that a turning movement of the spindle 46 will first swing the arm 45 and move the valve 62 by the rod 64 and open one or the other of the ports 52 or 53 as the case may be and that in case there is no other force for swinging the arm 33, a continued turning movement of the spindle 46 will turn the hub 32 and spindle 13 as soon as the free movement allowed by the notches 48 and 49 is taken up, and that if another force should move the arm 33 the ports 52 or 53 will over-run the valve 62 and become closed unless the spindle 46 should continue to be moved to keep the port 52 or 53, as the case may be, open.

The interlocking notches 48 and 49 cause both of the spindles 13 and 46 to move ever together longitudinally.

Since the spindles 13 and 46 both have similar movements and functions at times, they might be regarded as a single spindle 13—46. If the device were to be used manually only with the power means omitted, the two spindles 13 and 46 could be made integral or connected as one piece.

A tube 67 communicates with the inside of the cover 59.

Either pressure or vacuum fluid energy may be used as an operative medium for the power means.

It will be understood that rubber tubing or other flexible means, not shown, is to be used to transmit the fluid energy. Such means would connect: the tube 54 to an exhaust means, not shown, if a pressure medium is to be used, or to the engine intake manifold, not shown, if vacuum air is to be used; the tube 55 to the tube 42; the tube 56 with the tube 43; and the tube 67 with a pressure device, not shown, if a pressure medium is to be used or to the carburetor air cleaner, not shown, if vacuum air is to be used. This connecting means must be flexible, because the device 50 is secured to the arm 33 and moves therewith, and the cylinder 38 has a slight pivotal movement also on the support 97.

The end of the spindle 46 opposite the hub 44 is supported by an adjustable bracket 68 secured to some stationary part 69 of the automobile.

A crank arm 70 is secured to the spindle 46 by a pin 71 (Fig. 4).

A shaft 72 is mounted for longitudinal and turning movements in supports 73 and 74 which are secured to some stationary part of the automobile, preferably to the steering column 75, as shown.

A connecting member 76 is secured to the shaft 72 by a pin 77. Said member 76 has an elongated slot or hole 78 formed therethrough concentric with the shaft 72. A crank arm 79 is adjustably secured to the shaft 72 by a bolt through a hole in a part 81 of the arm 79 and the slot 78 of the member 76.

An operating link 82 is pivotally connected to the crank arms 70 and 79. Swinging abutments 83 and 84 each having one end pivotally secured to the link 82 and the other end pivotally secured to a convenient stationary part of the automobile are provided as fulcrums upon which the link is made to turn or oscillate in transmitting longitudinal movements to the spindle 46—13 by longitudinal movements of the shaft 72.

A tubular member 85 is supported on the shaft 72 for rotative movements only between the support 73 and the bracket 86 which secures the steering column 75 to the instrument panel (not shown).

A longitudinal slot 87 is provided in a wall of the member 85, and a pin 88 is mounted in a hole through the shaft 72 and extends through the slot 87. From this construction it will be seen that the member 85 cannot move longitudinally on account of abutment with the support 73 and the bracket 86, that the shaft 72 may be moved longitudinally without interference since the pin 88 may move along the slot 87, but that the member 85 cannot be rotated without turning the shaft 72 therewith on account of the pin 88 engaging the side walls of the slot 87.

A U-shaped fulcrum extension 89 projects substantially at right angles from one side of the member 85 and is secured to the member 85 by welding or otherwise.

A longitudinal slot 90 is formed through the wall of the member 85 under and in line with the U-shaped extension 89.

A hole 91 is bored in the substance of the shaft 72 adjacent to the slot 90 and substantially in line with the center of the U-shaped extension.

An operating lever 92 is pivotally secured in the other end of the U-shaped extension by a bolt or pin 93. The lever 92 extends inwardly in the U-shaped extension through the slot 90 and terminates in a ball formation 94, and the lever 92 extends outwardly to a proper operating length and terminates in an operating ball or other formation 95.

It can now be understood that swinging of the operating lever on the pin 93 will cause longitudinal movements of the shaft 72 as the ball 94 engages the wall of the hole 91 and that swinging of the lever in the opposite plane will cause turning movements of the shaft 72 through the action of the extension 89, member 85, slot 87 and pin 88.

It can be further seen that longitudinal movements of the shaft 72 will rotate or oscillate the link 82 and move the spindle 46—13 longitudinally through the arms 79 and 70 and their respective connections with the link 82 on account of the offset positions of the fulcrum links 83 and 84.

The cylinder 38 is supported in a pivotal manner in order to accommodate the swinging action of the lever 33. In the showing of the drawings this support is in the form of a projection 96 on the end of the cylinder 38 opposite the piston rod 36. The projection 96 is pivotally mounted on a rod 97 which is supported on or by some stationary part of the automobile as by the part 98 shown in Fig. 6.

In the operation of the device the operating lever 92 is swung on the fulcrum pin 93 to produce a positioning of the lug 27 in either the slot 28 or the slot 29 as the case may be through the action of the parts 94, 91, 72, 79, 82, 33, 84, 70, 46 (49 and 48), and 13. When the lever 92 is lowered these parts act in one direction to position the lug 27 in the notch 28 which is the selected position for shifting into reverse or low speed positions; and when the lever 92 is raised these parts act in the opposite direction to position the lug 27 in the notch 29 which is the selected position for shifting into second and high speed positions.

After the required selection has been made the lever 92 is swung in the opposite or horizontal plane to effect the required shift through the action of the parts 89, 85, 88, 72, 79, 82, 70, 46, 45, 66, 65, 64, 50, the proper tubing, the parts 38, 39, 36, 37, 33, 13 and 27, and the selected notch and respective lever 15 or 18, as the case may be.

Therefore, if it is desired to selectively shift into either reverse or low speed, the lever 92 is lowered and since the lever 92 fulcrums in this plane of movement on the pin 93 in the projection 89 which is rigid with the member 85 which is held against longitudinal movements by the stationary parts 73 and 86, and also since the lever 92 is extended beyond the fulcrum pin 93 to engage the shaft 72 by the ball end 94 in the hole 91, the shaft 72 is made to move longitudinally upwards; whereupon the arm 79 oscillates the link 82 on the off-set fulcrum 83 and the oscillating link 82 fulcruming on the part 84 acts on the crank 70 to move the spindles 46 and 13 longitudinally in the direction to cause the lug 27 to selectively engage the notch 28; then, if the shift to effect reverse speed is desired, the lever 92 is swung forward and causes the projection 89 to swing therewith and rotate the member 85 and shaft 72 in the same direction, on account of the rigid attachment of said projection 89 to the member 85 and the action of the slot 87 and pin 88; and the arm 79, which is rigidly attached to the shaft 72 and pivotally attached to the link 82, swings with said shaft 72 to effect a backward longitudinal movement of the link 82; and the arm 70, which is pivotally attached to the link 82 and rigidly attached to the spindle 46, effects a turning movement of said spindle 46 in a direction to cause the arm 45 to move the rod 64 toward the device 50 through the action of the hole 66 and pin 65 and the lash allowed by the loss motion slots 48 and 49, and thereby moving the valve 62 in the same direction to open the ports 52 and 53, whereupon the air in the chamber 40 is depleted by vacuum from the manifold of the engine through the following passageways: tube 54, port 51, port 52 and tube 55—42, and the atmospheric air rushes through the following passageways: tube 67, port 53 and tube 56—43 into chamber 41 to move the piston 39 towards the rear of the cylinder 38, whereby the piston rod 36 through the pin 37 swings the arm 33 in the same direction and turns the spindle 13 therewith, because of the rigid attachment of the hub 32 to the spindle 13 by the pin 34. This follow-up action of the power means will continue as the operator continues to move the lever 92, etc., to keep the valve 62 moved ahead of the ports 52 and 53, and the spindle continues likewise to turn; and, since the lug 27 has engaged the slot 28, the lever 11 is made to swing in the same direction and the yoke 3 through the action of the link 8 shifts the gear 2 to reverse speed position.

It can here be noted that if the operator in any shifting movements elects to stop the movement of the lever 92, the valve 62 is likewise stopped, and the action of the power means will follow to cause the ports 52 and 53 to overrun the valve 62 and become closed, and thus also stop the action of the power means, because the device 50 carrying the ports 52 and 53 is secured to and controlled by the power actuated lever 33, while the action of the valve 62 is controlled by the manually operated lever 45.

To bring the gear 2 from reverse position to neutral position the parts all act in the opposite direction to that of shifting into reverse position; and the valve 62 moving in the opposite direction opens the ports 52 and 53, whereupon the air in the chamber 41 is depleted by said vacuum through the following passageways: tube 54, port 53 and tube 56—41; and the atmospheric air rushes through the following passageways: tube 67, port 52 and tube 55—42 into chamber 40 to move the piston 39 towards the front, and the connected parts acting in the said opposite direction, brings the gear 2 to neutral position.

It is clear to see that the action of shifting the gear from neutral position to low position is the same as shifting said gear 2 to neutral position from reverse speed position, and the action of returning said gear 2 from low speed position to neutral position is the same as shifting said gear 2 from neutral position to reverse speed position.

If it is desired to selectively shift into either second or high speed, the lever 92 is raised and the action of all parts to effect selection are in a direction opposite to that for making the selection as recited above, for shifting into reverse or low speed, whereby the lug 27 is caused to selectively engage the notch 29; whereupon, if the shift to effect second speed is desired, the lever 92 is swung forward and the action of all parts is the same as for shifting into reverse, except the lug 27 having been selectively engaged in the notch 29 moves the lever 18 towards the rear and the synchronizer 14 is made to engage the second speed gear through the action of the yoke 15 and notch 17. To now bring the parts to neutral position and to high speed position all parts act in the opposite direction, and to effect high speed position the synchronizer 14 is made to engage the direct drive shaft. The action to bring the parts to neutral position from high speed position is the same as that to effect the shift into second speed position.

It is obvious that the required movements of the lever 92 can be changed by changing one or the other oscillating fulcrum supports 83 or 84 relatively to the opposite side of the lever 82, or by changing the direction of either of the crank arms 70 or 79 relatively to the opposite side of the respective shaft 46 or 72.

In the showing of the invention nothing has been shown for yieldingly holding the manual mean in the neutral or shifted positions, or for so holding the valve 62 in the port closed position; but if it is found desirable to use such means, it is understood that any known device for effecting such function or functions may be used.

It is understood that the customary interlock and spring plungers are to be used to properly control the shift rails 4 and 16.

It must now be apparent that my invention obtains all the intended objects in a highly efficient manner. Obviously, the construction, arrangement and relationship of the parts may be varied within the scope of equivalent limits without departure from the nature and principle of the invention. I do not restrict myself specifically otherwise than as set forth in the appended claims, nor do I restrict myself unessentially in any respects.

What I claim and desire to secure by Letters Patent is:

1. Gear shifting mechanism of the character described comprising a spindle, a second spindle, both of said spindles being mounted for longitudinal and rocking movements, means connecting said spindles for positive simultaneous longitudinal movements and for limited relative rotative movements, and manual means connected to said second spindle for operating said spindles.

2. Mechanism of the character described comprising a case, a bearing formed in said case, a hole provided in a wall of said case in line with said bearing, a bearing member secured to said case over said hole and in line with said first named bearing, a spindle mounted in said bearing, a pair of lever arm hubs mounted on said spindle between said first named bearing and said wall, notches formed on the adjacent faces of said hubs, a lug secured to said spindle for engaging said notches, and a slot formed longitudinally through the said hub adjacent said wall for assemblage purposes.

3. Mechanism of the character described comprising shifter elements, a shaft mounted for longitudinal and turning movements, means operatively connected to said shaft for selectively engaging and shifting said elements by said longitudinal and turning movements respectively of said shaft, a member supported for turning movements only, pin and slot means connecting said shaft and said member for turning said shaft by said member but not effecting longitudinal movements of said shaft, and an operating lever connected to said member and directly engaging said shaft for moving said shaft longitudinally and also for turning said member and thereby said shaft.

4. Mechanism of the character described comprising shifter elements, a shaft connected in a manner for longitudinal selective movements and for rotative shifting movements to selectively shift said elements, means including a pin and slot operatively connected to said shaft for turning said shaft and an operating lever connected to said means and directly engaging said shaft for moving said shaft longitudinally and also for actuating said means to turn said shaft.

5. Gear shifting mechanism of the character described comprising shifter elements, a spindle selectively engageable for shifting said elements, a shaft mounted for longitudinal and rocking movements and connected to said spindle for selectively positioning and imparting shifting movements to said spindle by said longitudinal and rocking movements respectively of said shaft, a member supported for rocking movements only, pin and slot means associated with said shaft and said member whereby said shaft is turned by said member but said means not affecting longitudinal movements of said shaft, and an operating lever supported by said member and directly engaging said shaft for turning said member, and also for moving said shaft longitudinally.

6. Gear shifting mechanism of the character described comprising shifter elements, a spindle selectively engageable for shifting said elements, a shaft mounted for longitudinal and rocking movements and connected to said spindle for selectively positioning and imparting shifting movements to said spindle by said longitudinal and rocking movements respectively of said shaft, a member supported for rocking movements only, pin and slot means associated with said shaft and said member for holding said shaft and said member against relative rotative movement, and an operating lever pivotally connected to said member and said shaft for turning said member and thereby said shaft and also for moving said shaft longitudinally.

7. Gear shifting mechanism of the character described comprising shifter elements, a spindle selectively engageable for shifting said elements, a shaft mounted for longitudinal and rocking movements and connected to said spindle for selectively positioning and imparting shifting movements to said spindle by said longitudinal and rocking movements respectively of said shaft, a member supported for rocking movements only, pin and slot means cooperatively connected in a manner for holding said shaft and said member against relative rotative movements, an operating lever, means operatively connecting said lever directly with said shaft for moving said shaft longitudinally, said lever being attached to said member for positive action to turn said member and for pivotal action to operate said means.

8. Gear shifting mechanism of the character described comprising two shifter elements, two selective crank arms, one of said crank arms being directly connected to one of said elements for shifting the same, the other of said crank arms having link connection with the other of said elements for shifting the same, means selectively engageable for operating said crank arms, a link mounted for oscillation and longitudinal movements and connected to said means for selectively positioning said means and moving said means to operate the selected arm, and an operating shaft mounted for longitudinal and turning movements and connected to said link to respectively oscillate and move said link longitudinally.

9. Gear shifting mechanism of the character described comprising a shaft, an arm supported by said shaft for swinging movements, a second arm pivotally supported by said shaft for swinging movements, a lost motion connection directly supported by said arms for limiting relative swinging movements between said arms, and operating means connected to said second arm for operating said arms.

10. Gear shifting mechanism of the character described comprising a shaft mounted for turning movements, an arm rigidly supported by said shaft, a second arm pivotally supported by said shaft for swinging movements, a lost motion connection directly supported by said arms for limiting relative swinging movements between said arms, and operating means connected to said second arm for operating said arms.

ELMER G. KESLING.